US012578985B2

(12) United States Patent
Ahlvin et al.

(10) Patent No.: US 12,578,985 B2
(45) Date of Patent: Mar. 17, 2026

(54) HYBRID VIRTUAL MACHINE ALLOCATION OPTIMIZATION SYSTEM AND METHOD

(71) Applicant: Microsoft Technology Licensing, LLC, Redmond, WA (US)

(72) Inventors: Benjamin Eric Ahlvin, Seattle, WA (US); Sida Peng, Chestnut Hill, MA (US); Abigail Sandra Atchison, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 631 days.

(21) Appl. No.: 18/070,118

(22) Filed: Nov. 28, 2022

(65) Prior Publication Data
US 2024/0176637 A1    May 30, 2024

(51) Int. Cl.
*G06F 9/455* (2018.01)
*G06Q 10/04* (2023.01)

(52) U.S. Cl.
CPC ......... *G06F 9/45558* (2013.01); *G06Q 10/04* (2013.01); *G06F 2009/4557* (2013.01); *G06F 2009/45595* (2013.01)

(58) Field of Classification Search
CPC ......... G06F 9/45558; G06F 2009/4557; G06F 2009/45595; G06Q 10/04
See application file for complete search history.

(56) References Cited

U.S. PATENT DOCUMENTS

| | | | | |
|---|---|---|---|---|
| 2016/0188375 A1* | 6/2016 | Kozloski | ............... | G06F 9/5033 |
| | | | | 718/104 |
| 2017/0024640 A1* | 1/2017 | Deng | ........................ | G06N 3/04 |
| 2020/0210920 A1* | 7/2020 | Joseph | .................... | G06N 20/00 |
| 2020/0293374 A1* | 9/2020 | Phuke | .............. | G06Q 10/06311 |
| 2021/0287108 A1* | 9/2021 | Hwang | ............... | G06F 11/3616 |
| 2022/0327002 A1 | 10/2022 | Yang et al. | | |

OTHER PUBLICATIONS

International Search Report and Written Opinion received for PCT Application No. PCT/US2023/033914 mailed on Jan. 3, 2024, 17 pages.
Yang et al., "Spot Virtual Machine Eviction Prediction in Microsoft Cloud," Proceedings of the 23rd International Middleware Conference: Tutorials, ACMPUB27, New York, NY, USA, Apr. 25, 2022, 152-156 pages.
"Forecasting at Scale", Retrieved From: https://facebook.github.io/prophet/, Retrieved on: Dec. 1, 2022, 4 Pages.
(Continued)

*Primary Examiner* — Jacob D Dascomb
(74) *Attorney, Agent, or Firm* — Novo TechIP International PLLC

(57) ABSTRACT
Systems and methods for determining an allocation plan for allocating virtual machines (VMs) to a hosted service utilizes a demand forecast that predicts future demand for VMs, a response curve that correlates user experience to VM utilization, and an estimated spot eviction rate to determine the allocation plan. The demand forecast, the response curve and the eviction rate are processed using mixed-integer optimization to determine the numbers of VMs of each allocation type that should be online at any given time to meet demand.

20 Claims, 9 Drawing Sheets

(56)                       References Cited

OTHER PUBLICATIONS

"Virtual Machines Selector", Retrieved From: https://azure.microsoft.
com/en-us/pricing/vm-selector/, Retrieved on: Dec. 1, 2022, 3 Pages.
International preliminary report on patentability Received for PCT
Application No. PCT/US23/033914, mailed on Jun. 5, 2025, 10
Pages.

* cited by examiner

800

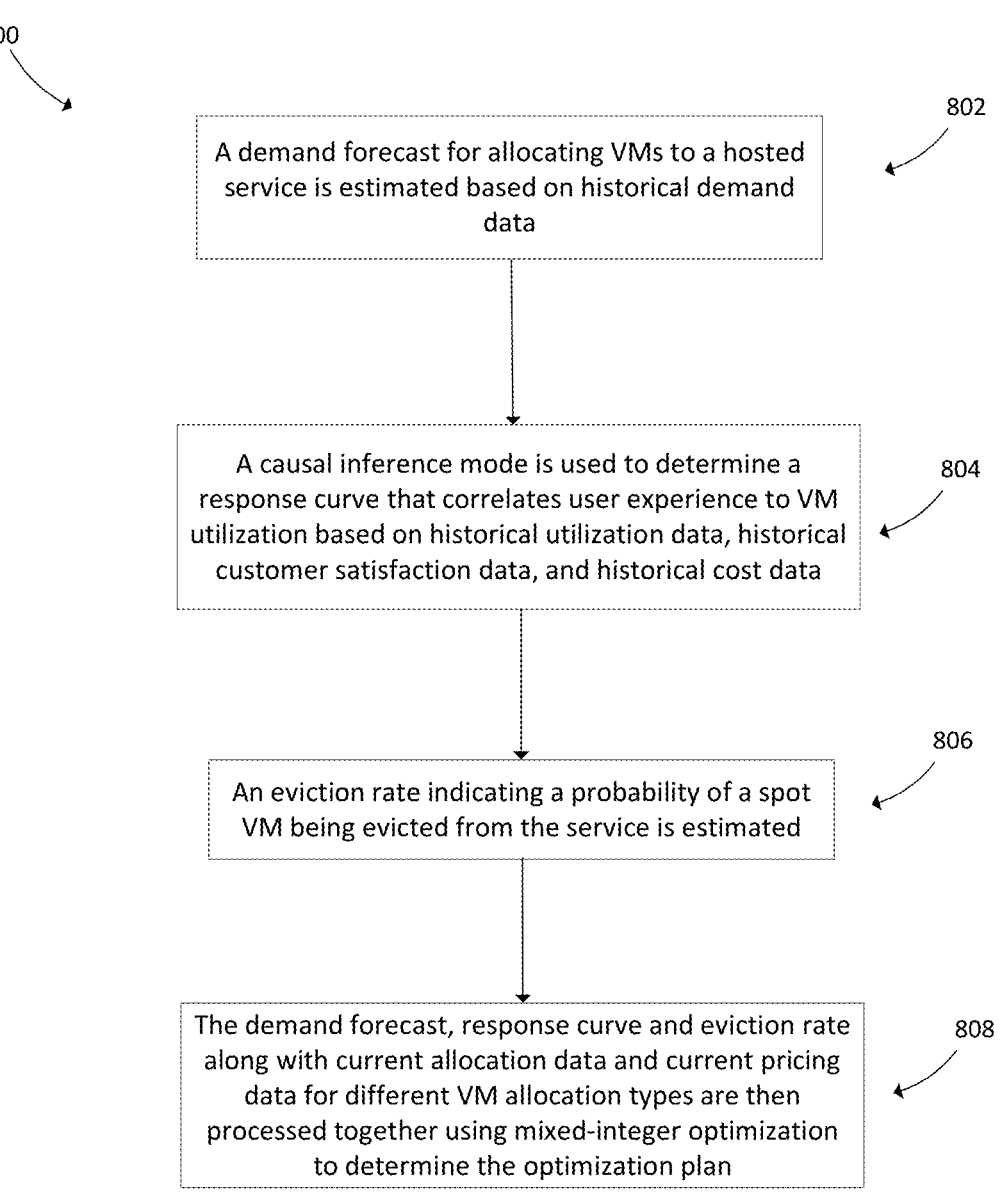

802

A demand forecast for allocating VMs to a hosted service is estimated based on historical demand data

804

A causal inference mode is used to determine a response curve that correlates user experience to VM utilization based on historical utilization data, historical customer satisfaction data, and historical cost data

806

An eviction rate indicating a probability of a spot VM being evicted from the service is estimated

808

The demand forecast, response curve and eviction rate along with current allocation data and current pricing data for different VM allocation types are then processed together using mixed-integer optimization to determine the optimization plan

FIG. 8

HYBRID VIRTUAL MACHINE ALLOCATION OPTIMIZATION SYSTEM AND METHOD

BACKGROUND

A cloud computing platform refers to a collection of computing resources that may be allocated to customers and used to host services and applications online so they may be accessed remotely. A cloud computing platform, operated by a cloud service provider, enables customers to utilize services and applications without having to own the computing resources that would be required to run the services and applications locally. To have services hosted on a cloud computing platform, customers typically enter into contracts with cloud service providers to purchase the resources required to implement the service on the cloud computing platform.

Traditionally, virtual machines (VMs) have been allocated to customers based primarily on a pay-as-you-go pricing model. Under a pay-as-you-go-model, customers select the type(s) of VMs to utilize for the service and a billing rate for the selected type(s) of VMs is agreed upon. The cloud service provider is responsible for making the selected type(s) of VMs available for allocation to the customer upon request. The customer in turn is responsible for determining when to request the allocation of VMs as well as the number of VMs to allocate. The customer is billed for each VM allocated to the customer at the agreed upon billing rate based on the amount of time that each VM was allocated to the customer. Allocated VMs are typically scaled to meet changes in demand on the service by allocating additional VMs when demand for the service increases and by releasing allocated VMs when demand for the service decreases. The goal of scaling is typically to maintain a desired level of performance for the service at a minimal cost to the customer.

When VM allocations are based only on a pay-as-you-go pricing model, the scaling of resources is typically a straightforward process. For example, the cost of VM allocations depends primarily on two variables, i.e., the demand on the service and the desired level of performance to be maintained. Maintaining the desired level of performance involves monitoring demand on the service and adjusting the allocation of VMs to maintain the desired level of performance using a minimal number of VMS.

Previously known systems have required the customers to be responsible for determining when to request additional VMs and when to release allocated VMs so that the VMs for the service are scaled appropriately. However, the demand for resources in a hosted service can change rapidly, and customer-based scaling is typically a manual process that is inadequate to react to the rapid changes in demand that often occur.

To facilitate the scaling of resources for customers, autoscaling systems have been developed that enable VMs to be scaled automatically in response to changes in demand. Autoscaling systems simply monitor the demand on the service and can allocate and/or provision additional VMs for the service in response to increases in the demand and release and/or decommission VMs in response to decreases in demand on the service. Because autoscaling is computer-implemented, autoscaling is better able to make required adjustments in response to rapid changes in demand than customer-based approaches.

Autoscaling resources requires little user involvement and is typically limited to determining the thresholds of demand used by the autoscaling system to determine when and how to scale the VMs allocated to the service. The selection of suitable thresholds by a user does enable a desired level of performance to be provided by the service as VM allocations are scaled. Thresholds are determined primarily through offline load testing and typically have to be reevaluated any time significant changes occur to performance characteristics and/or as business priorities shift.

As noted above, determining an optimal allocation plan for scaling resources is relatively straightforward when the cost of allocation depends solely on a pay-as-you-go pricing model. However, cloud service providers may allow customers to purchase VMs based on different VM allocation types having different pricing models. Examples of the different VM allocation types that may be implemented by a cloud service provider include an on-demand allocation type based on the pay-as-you-go model described above, a reserved allocation type based on a reservation pricing model that enables VMs to be reserved for long-term durations, and a preemptible allocation type that utilizes a preemptible pricing model, or spot model, that enables spot VMs to be purchased at a significant discount relative to other pricing models with the provision that spot VMs can be taken away from the service at any time with minimal warning.

Each of the allocation types has advantages and disadvantages in certain situations. Different number of VMs of each allocation type may be combined in many different ways to handle workloads. However, the use of multiple VM allocation types having different characteristics and pricing models has greatly increased the complexity of determining an optimal allocation plan for the service. Current systems used to scale resources are generally not capable of processing the many variables that result from using multiple allocation types and pricing models for allocating resources to determine an optimal allocation plan.

Furthermore, previously known techniques for resource scaling do not take user satisfaction into consideration in determining when and/or how resources should be scaled. User satisfaction is an important indicator of system performance. However, suitable methods of using user satisfaction to help with scaling decisions have yet to be developed.

Hence, what is needed are systems and methods for determining allocation plans for customers of a cloud computing platform that enables optimal selection and scheduling of resources based on multiple allocation types having different pricing models and that takes user satisfaction into consideration in determining the allocation plans.

SUMMARY

In one general aspect, the instant disclosure presents a data processing system having a processor and a memory in communication with the processor wherein the memory stores executable instructions that, when executed by the processor, cause the data processing system to perform multiple functions. The functions may include estimating a demand forecast for allocating virtual machines (VMs) to a service hosted by a cloud service provider over a predetermined allocation time period based on historical demand data; using a causal inference model to determine a response curve that correlates user experience to VM utilization, the causal inference model receiving historical utilization data, historical customer satisfaction data, and historical cost data and producing the response curve as an output; estimating an eviction rate for spot VMs based on historical eviction data; and using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period.

In yet another general aspect, the instant disclosure presents a method for determining allocation plan for identifying numbers of VMs of each of a plurality of VM allocation types to allocate to a service hosted by a cloud service provider during an allocation time period. The method includes estimating a demand forecast for allocating virtual machines (VMs) to a service hosted by a cloud service provider over a predetermined allocation time period based on historical demand data; using a causal inference model to determine a response curve that correlates user experience to VM utilization, the causal inference model receiving historical utilization data, historical customer satisfaction data, and historical cost data and producing the response curve as an output; estimating an eviction rate for spot VMs based on historical eviction data; and using an allocation optimizer model to process the demand forecast, the response curve, and the eviction rate along with current allocation data and current pricing data corresponding to a plurality of different VM allocation types to determine an allocation plan that identifies numbers of VMs of each of the VM allocation types to allocate during the allocation time period.

In a further general aspect, the instant application describes a non-transitory computer readable medium on which are stored instructions that when executed cause a programmable device to perform functions of estimating a demand forecast for allocating virtual machines (VMs) to a service hosted by a cloud service provider over a predetermined allocation time period based on historical demand data; using a causal inference model to determine a response curve that correlates user experience to VM utilization, the causal inference model receiving historical utilization data, historical customer satisfaction data, and historical cost data and producing the response curve as an output; estimating an eviction rate for spot VMs based on historical eviction data; and using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 is a flowchart of an example method for determining an optimal allocation plan for allocating VMs to a service hosted by a cloud service provider.

DETAILED DESCRIPTION

Figure 1:
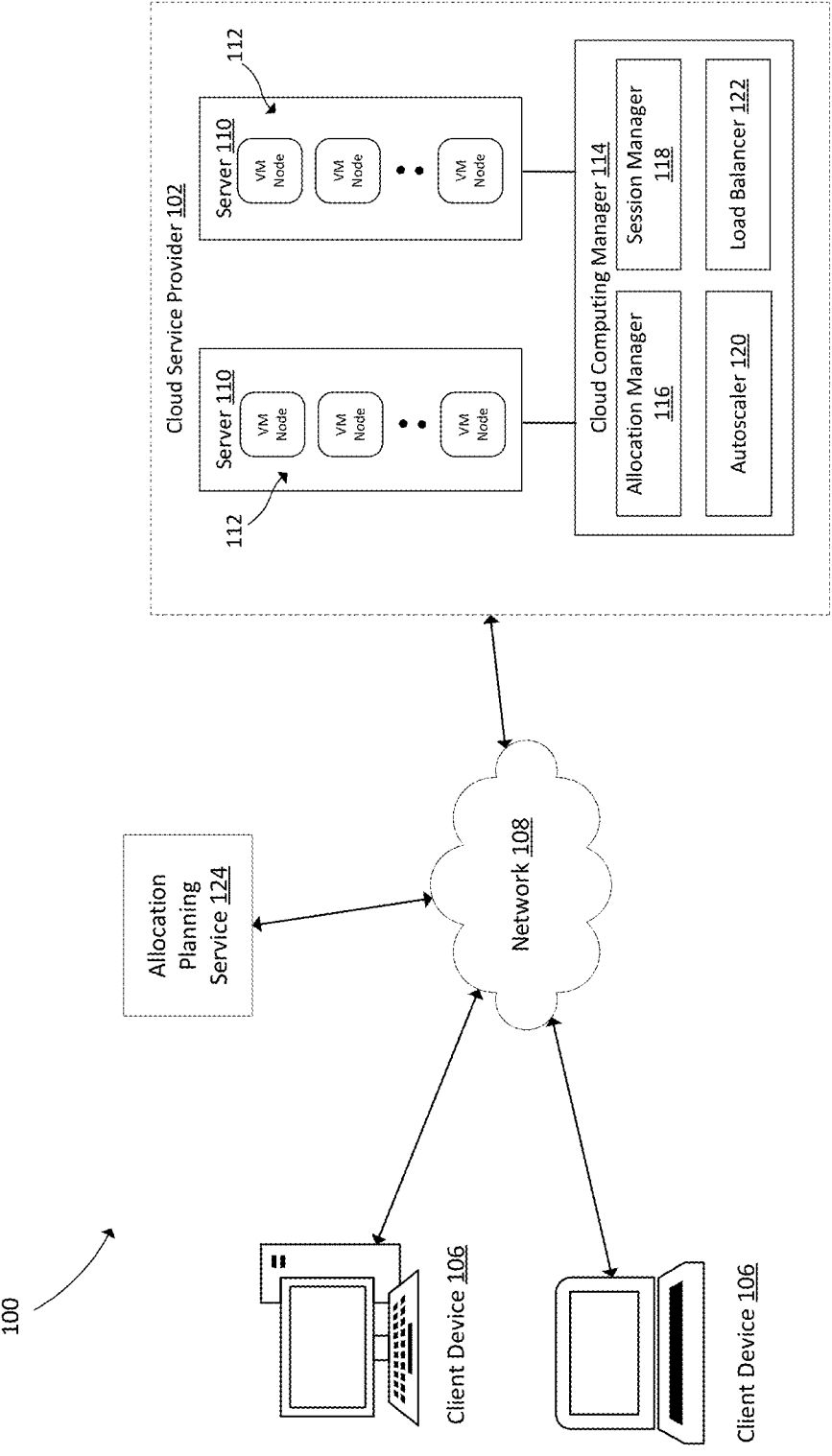
FIG. 1 depicts an example system upon which aspects of this disclosure may be implemented.

Traditionally, VMs have been allocated to customers based primarily on a pay-as-you-go pricing model. Under a pay-as-you-go-model, customers select the type(s) of VMs to utilize for the service and a billing rate for the selected type(s) of VMs is agreed upon. The cloud service provider is responsible for making the selected type(s) of VMs available for allocation to the customer upon request. The customer in turn is responsible for determining when to request the allocation of VMs as well as the number of VMs to allocate. The customer is billed for each VM allocated to the customer at the agreed upon billing rate based on the amount of time that each VM was allocated to the customer. Allocated VMs are typically scaled to meet changes in demand on the service by allocating additional VMs when demand for the service increases and by releasing allocated VMs when demand for the service decreases. The goal of scaling is typically to maintain a desired level of performance for the service at a minimal cost to the customer.

When VM allocations are based only on a pay-as-you-go pricing model, optimal scaling of resources is typically a straightforward process. For example, the cost of VM allocations depends primarily on two variables, i.e., the demand on the service and the desired level of performance to be maintained. Maintaining the desired level of performance involves monitoring demand on the service and adjusting the allocation of VMs to maintain the desired level of performance using a minimal number of VMS.

However, cloud service providers may allow customers to purchase VMs based on different VM allocation types having different pricing models. Examples of the different VM allocation types that may be implemented by a cloud service provider include an on-demand allocation type based on the pay-as-you-go model described above, a reserved allocation type based on a reservation pricing model that enables VMs to be reserved for long-term durations, and a preemptible allocation type that utilizes a preemptible pricing model, or spot model, that enables spot VMs to be purchased at a significant discount relative to other pricing models with the provision that spot VMs can be taken away from the service at any time with minimal warning.

VMs allocated according to the on-demand allocation type and that utilize a pay-as-you-go model are billed for each VM allocated to the service based on the amount of time each VM is allocated to the service. There is no long-term commitment so capacity can be increased or decreased as needed. This option can be more expensive than the other allocation types, but this option offers the most flexibility and reliability in terms of adjusting to unpredictable workloads. The reserved allocation type utilizing a reservation pricing model enables VMs to be reserved for exclusive use by a customer for a set period of time and at a price that is typically less than the pay-as-you-go model. Reserved VMs are useful for predictable workloads and in situations that require a minimum level of support to be maintained at all times regardless of workload. However, there is a risk that future demand will decrease more than expected which could result in VMs being paid for that are no longer necessary.

The preemptible model, or spot model, enables VMs to be purchased from a pool of currently unused VMs at a significantly lower price than the pay-as-you-go machines or reserved machines. However, there is the provision that these "spot" VMs can be taken away (i.e., evicted) with minimal warning by the cloud platform provider for whatever reason, such as higher-level commitments (e.g., pay-as-you-go or reservations) to other customers. The risk of eviction means that spot VMs are typically not a good choice to use as a primary handler for mission critical, production workloads that cannot afford a service interruption. However, spot virtual machines may be a good (and less expensive) choice for handling certain types of workloads, such as distributed, fault-tolerant workloads that do not require continuous availability. Spot VMs may also be useful as a stopgap to help handle spikes and other sudden or unexpected increases in demand.

Each of the allocation types has advantages and disadvantages in certain situations which enables different number of VMs of each allocation type to be combined in many different ways to handle a given workload. However, the use of multiple VM allocation types having different characteristics and pricing models has greatly increased the complexity of determining an optimal allocation plan for the service. Current systems used to scale resources are generally not capable of processing the many variables to determine an optimal allocation plan for scaling resources.

Furthermore, previously known techniques for resource scaling do not take user satisfaction into consideration in determining when and/or how resources should be scaled. User satisfaction is an important indicator of system performance. User satisfaction can be used to facilitate the selection of allocation strategies that can improve user satisfaction or that have the least impact on user satisfaction.

To address these technical problems and more, in an example, this description provides technical solutions in the form of allocation planning systems and methods that enable optimal allocation plans to be determined for a customer of a cloud service provider based on multiple allocation types having different pricing models. The systems and methods track the impact of different utilization levels and/or allocation types on user satisfaction. An optimization engine is used to ingest demand forecasts along with information on allocation types and spot VM eviction modeling to produce an optimized allocation plan that mixes pay-as-you-go and reserved allocation types with possible overallocation with spot VMs to arrive at an allocation strategy that enables a hosted service to meet expected demand in the most cost-efficient manner.

The allocation planning system includes a demand forecasting component that forecasts demand, a customer satisfaction (CSAT):cost of goods sold (COGs) analysis component for determining a response curve that correlates user satisfaction with VM utilization, and a spot eviction modeling component for estimating a probability of spot evictions. The demand forecast, response curve and probability of spot evictions are fed to an allocation optimizer trained to process the demand forecast, response curve and probability of spot evictions using mixed-integer optimization to determine the optimal allocation plan.

Compared with existing autoscaling systems, the allocation planning system according to this disclosure has broader compatibility with a full spectrum of VM types as well as existing tools. Given the available VM allocation types, constraints introduced by the workload, and the demand forecast, the allocation optimizer finds the mathematically optimal combination of VM allocation types and generates an easy-to-consume plan or schedule that specifies when each VM should be allocated and deallocated.

Another advantage of the allocation planning systems and methods described herein is that machine learning, dynamic optimization, and causal inference are combined to determine a optimal allocation plan, which allows decisions to be made based on causation. The system in turn is more adaptive to fast-changing cloud usage scenarios and can quickly respond to real time shocks.

In addition, by leveraging a back end that automatically performs forecasting, causal inference, and optimization, developers may be provided with a user friendly UI that allows them to adjust parameters and determine the most appropriate allocations for the upcoming weeks. This "human-in-the-loop" approach allows important insights to be leveraged that may not be apparent in the data, such as an anticipated upcoming spike in demand due to a marketing campaign. Further, insights may be provided to customers in a format that is easy to consume and understand, which enhances their ability to make decisions based on the data. For example, rather than showing a table of historical VM eviction rates, the data may be leveraged to produce a chart showing the probability of degraded customer experience due to evictions likely with the current allocation plan.

FIG. 1 shows an example computing environment 100, upon which aspects of this disclosure may be implemented. The computing environment 100 includes a cloud service provider 102, client devices 106, and a network 108. The cloud service provider 102 has computing resources that may be allocated to customers and used to implement one or more services and/or applications which can be hosted online and accessed via the network 108. To this end, cloud service provider 102 includes one or more servers 110 that provide computing resources, such as VM nodes 112, which may be allocated to one or more customers and/or services hosted on the platform.

Servers 110 may be organized in farms, clusters, racks, containers, data centers, geographically disperse facilities, and the like, and may communicate with each other via a variety of types of networks. Two servers 110 are shown as part of the cloud service provider 102 of FIG. 1, although any suitable number of servers may be utilized. Each server 108 is configured to provide one or more virtual machine (VM) nodes 112.

Cloud service provider 102 includes a cloud computing manager 114 for managing resources of the cloud computing system. As such, the cloud computing manager 114 is configured to deploy, configure and/or manage servers 110, VM nodes 112, and other resources of the platform. The cloud computing manager 114 includes an allocation manager 116 that is configured to manage allocation of resources to customers. The allocation manager 116 receives requests for allocation of computing resources from customers. The requests identify one or more VM allocation types and/or pricing models of VMs requested for allocation. Examples of allocation types and associated pricing models include an on-demand allocation type that is based on a pay-as-you-go pricing model, a reserved allocation type that is based on a reservation pricing model, and a preemptible, or spot allocation type based on a spot pricing model. Depending on the requested allocation type, allocation requests may also identify a number VMs to allocate for each selected allocation type.

In embodiments, allocation manager 116 organizes active VM nodes 112 into one or more VM pools depending on various factors, such as the type of request(s) handled by the VM nodes, VM allocation type, and the like. The VM nodes allocated to a customer may be included in a single VM pool or distributed among multiple VM pools. The allocation manager 116 is configured to allocate VM nodes and/or VM pools to customers/services in accordance with allocation requests and to track which VM nodes and/or VM pools are currently allocated to which customers. The allocation manager 116 is also configured to allocate additional VM nodes, remove (or evict) VM nodes, provision additional VM nodes, and decommission VM nodes as needed to comply with resource requests, contracts, service level agreements (SLAs), requirements associated with allocation types and/or pricing model, and any other guidelines or constraints associated with VM allocations.

To access a service implemented by the cloud service provider 102, an application on a client device 106 typically opens a connection to a server 110 of the cloud service provider 102 and establishes a session. A session represents an ongoing exchange of data, messages, and the like between an application and a server. The cloud computing manager 114 includes a session manager 118 for establishing and managing sessions between client devices 106 and servers 110. To establish a session, one or more VM nodes 112 are assigned to the session for handling requests for the service. VM nodes 112 assigned to a session are taken from VM nodes allocated to the service for which the session is established. VM nodes 112 remain assigned to sessions as long as sessions are active, i.e., as long as requests for service are being received. Session manager 118 may be configured to terminate sessions that have been determined to be idle sessions based on one or more predefined metrics used to identify idle sessions.

The cloud computing manager 114 includes an autoscaler 120 configured to automatically scale the VM nodes 112 provided by the cloud service provider 102 to accommodate changes in demand or load on the resources of the platform. In embodiments, autoscaler 120 is configured to monitor utilization of CPUs hosting VM nodes as an indicator of demand or load and to compare CPU utilization to predetermined thresholds. When CPU utilization exceeds a predetermined threshold (indicating a high load), the autoscaler 120 provisions one or more additional VM nodes 112 to help with processing requests to prevent overutilization of VMs. When CPU utilization falls below a predetermined threshold, the autoscaler 120 shuts down one or more VM nodes to prevent underutilization of VMs. Autoscaler 120 may be configured to scale VM nodes with respect to each customer and/or service hosted by the cloud service provider 102 and/or with respect to the cloud service provider 102 as a whole.

The cloud computing manager 114 also includes a load balancer 122 for balancing the load on the platform between the servers 110 and VM nodes 112 by directing requests for services to different servers 110 and VM nodes 112 in an effort to balance out resource utilization across multiple physical and/or virtual computing resources. The load balancer 122 utilizes one or more parameters, such as resource utilization, number of connections, and/or overall performance, to determine where to direct requests for services. In embodiments, the load balancer 122 directs requests for services to a server and/or VM node allocated to the service being requested. The load balancer 122 may be configured to balancing loading of resources with respect to each customer and/or service hosted by the cloud service provider 102 and/or with respect to the resources of the cloud service provider 102 as a whole.

Client devices 106 enable users to request access to services and/or applications hosted by the cloud service provider 102. Client devices 106 may comprise any suitable type of computing device that enables a user to interact with various applications. Examples of suitable computing devices include but are not limited to personal computers, desktop computers, laptop computers, mobile telephones, smart phones, tablets, phablets, smart watches, wearable computers, gaming devices/computers, televisions, and the like. Client devices 106 and cloud service provider 102 communicate via network 108. Network 108 may include one or more wired/wireless communication links and/or communication networks, such as a PAN (personal area network), a LAN (local area network), a WAN (wide area network), or a combination of networks, such as the Internet.

Figure 2:
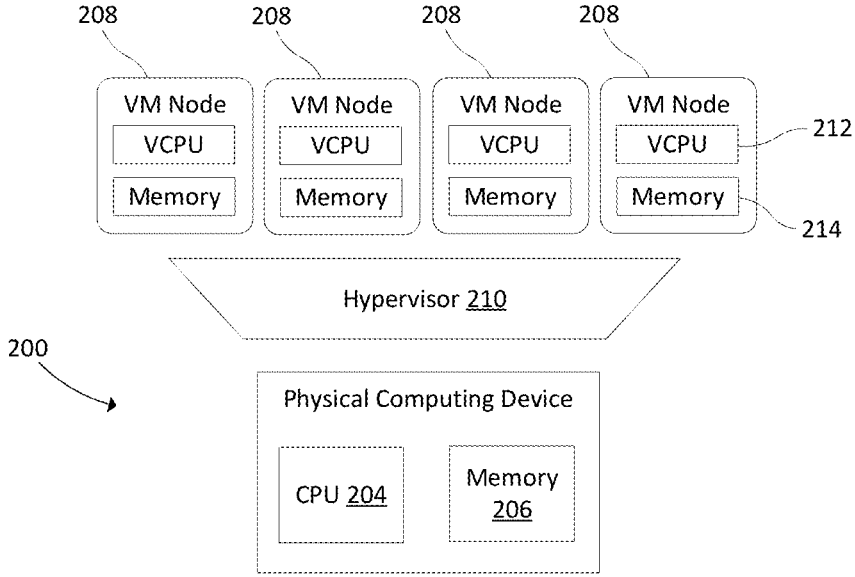
FIG. 2 shows an example of a computing device for providing virtual machine nodes for a cloud service provider, such as the cloud service provider of FIG. 1.

Each server 110 includes one or more physical computing devices for hosting the VM nodes 112 of the server 110. FIG. 2 shows an example of such a computing device. Computing device 200 of FIG. 2 may be any of a variety of different types of computing devices. For example, computing device 200 may be a desktop computer, a server computer, a laptop, and the like. Computing device 200 includes physical resources, such as a central processing unit (CPU) 204 and memory 206. Computing device 200 may also include other components not shown, such as network interface devices, disk storage, input/output devices, and the like. The CPU 204 may be any type or brand of CPU. The memory 206 may include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 204. Though computing device 200 is shown as having only one CPU 204 and one memory 206, a computing device may include any suitable number of processors and/or memories.

Computing device 200 is a host device, and, as such, is configured to host one or more virtual machine nodes 208. To this end, computing device 200 includes a hypervisor 210 configured to generate, monitor, terminate, and/or otherwise manage VM nodes 208. Hypervisor 210 is software, firmware and/or hardware that emulates virtual resources for the VM nodes 208 using the physical resources 204 and 206 of the computing device 200. More specifically, hypervisors 210 allocate processor time, memory, and disk storage space for each VM node 208. The hypervisor 210 also provides isolation between the VM nodes 208 such that each VM node 208 can include its own operating system and run its own programs.

VM nodes 208 are software implementations of physical computing devices that can each run programs analogous to physical computing devices. Each VM node 208 includes virtual resources, such as virtual processor (VCPU) 212 and virtual memory 214 and may be configured to implement a guest operating system. The VCPU 212 is implemented as software with associated state information that provides a representation of a physical processor with a specific architecture. Different VM nodes 208 may be configured to emulate different types of processors. For example, one VM node may have a virtual processor having characteristics of an Intel x86 processor, whereas another virtual machine node may have the characteristics of a PowerPC processor. Guest operating system may be any operating system such as, for example, operating systems from Microsoft®, Apple®, Unix, Linux, and the like. Guest operating system may include user/kernel modes of operation and may have kernels that can include schedulers, memory managers, etc. Each guest operating system may have associated file systems implemented in virtual memory and may schedule threads for executing applications on the virtual processors. Applications may include applications for processing client requests and/or implementing functionality of the server.

The hypervisor 210 enables multiple VM nodes 208 to be implemented on computing device 200 by allocating portions of the physical resources 204 and 206 of the computing devices 200, such as processing time, memory, and disk storage space, to each VM node 208. Hypervisor 210 may be configured to implement any suitable number of VM nodes 208 on the computing device 200. The hypervisor 210 of FIG. 2 is shown has having instantiated five VM nodes 208, although computing devices are generally capable of supporting more VM nodes. Hypervisor may be configured to instantiate any suitable number of VM nodes 208 on computing device 200, depending on various factors, such as hardware configuration, software configuration, application, and the like.

Returning to FIG. 1, the computing environment 100 of FIG. 1 includes an allocation planning service 124 that enables customers of a cloud service provider, such as cloud service provider 102, to access an allocation planning system online via the network 108. The allocation planning system 124 can determine optimal allocation plans for hosted services using historical data, such as historical utilization data, historical CSAT data, historical COGS data, and historical spot eviction rate data, as well as current allocation data and relative costs of the different allocation types offered by the cloud service provider. The historical data is processed to generate inputs to an optimization engine, such as a demand forecast, a response curve that correlates VM utilization to customer satisfaction, and spot VM eviction rate data. The optimization engine ingests the demand forecast, response curve data, and spot VM eviction rate data along with current allocation data and relative costs of allocation types to produce an optimized allocation plan that specifies the numbers of VMs of each allocation type to be allocated at every moment to enable a hosted service to meet expected demand in the most cost-efficient manner.

Figure 3:
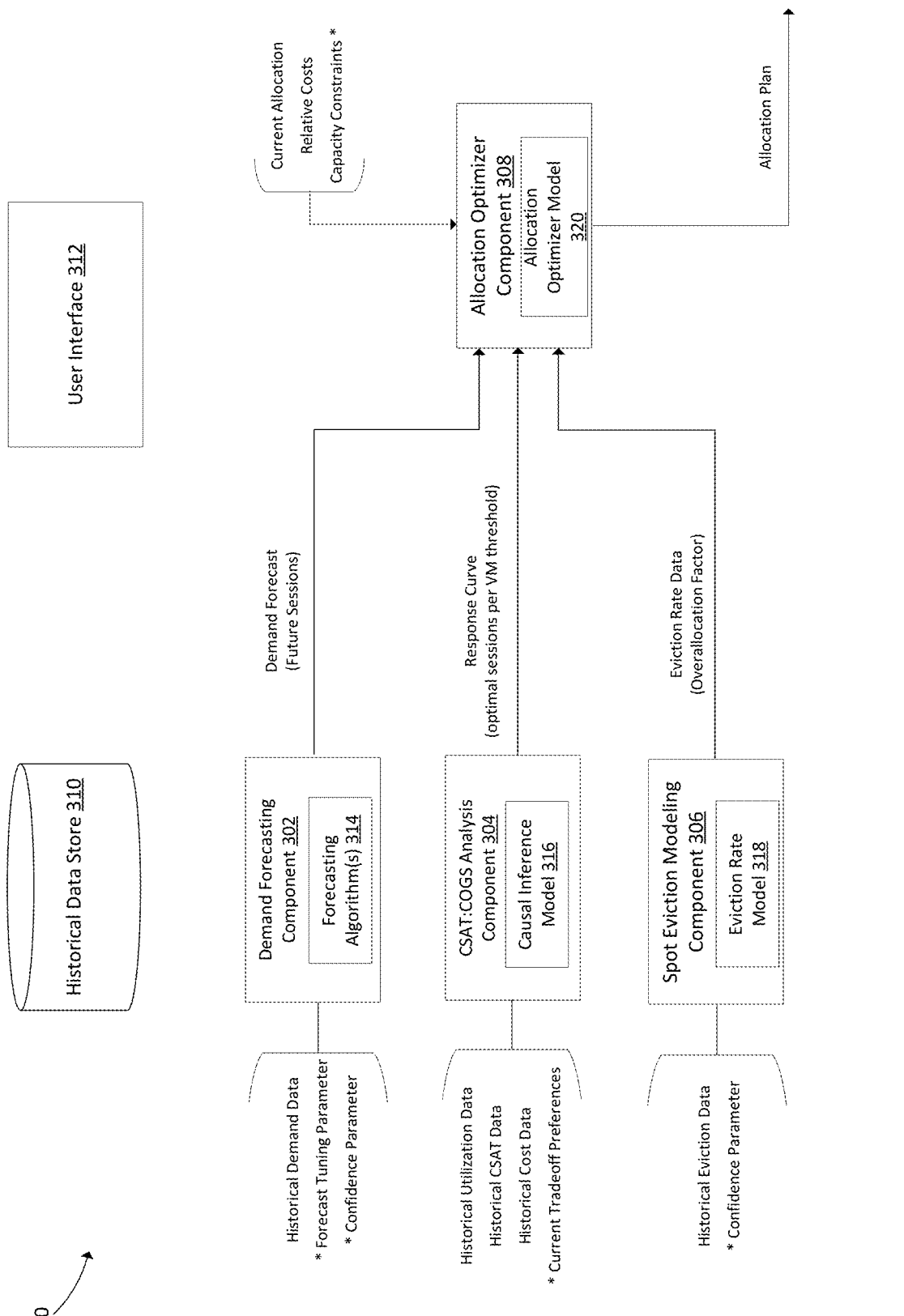
FIG. 3 shows an example of an allocation planning system for determining allocation plans for customers of a cloud service provider.

An example implementation of an allocation planning system 300 in accordance with this disclosure is shown in FIG. 3. The allocation planning system 300 includes a demand forecasting component 302, a CSAT: COGS analysis component 304, a spot eviction modeling component 306, and an allocation optimizer component 308. The demand forecasting component 302 receives historical demand data as well as user defined/selected parameters (indicated by "*" in FIG. 3) and processes the historical demand data using one or more forecasting algorithms 314 to generate a demand forecast. Prophet is an example of a forecasting algorithm that may be utilized in forecasting demand based on historical demand data. The demand forecasting component 302 includes mechanisms that enable users to define and/or select parameters, such as a forecast tuning parameter and/or a confidence parameter. The forecast tuning parameter may be used to adjust a feature of the forecasting algorithm and/or the historical demand data to adjust how the demand forecast is generated. The confidence parameter may define confidence bounds for predictions.

The CSAT: COGs analysis component 304 uses a causal inference model 316 that has been trained to determine a causal relationship between customer experience and VM utilization and/or VM allocation type. CSAT is a metric used to measure the level of satisfaction customers have with a product or a service. In embodiments, CSAT is measured by user responses to rating-type questions and may be indicated by an integer value on a predefined scale (e.g., 1 to 5). COGS is a metric that is used to indicate the cost of goods, which in this case refers to the costs associated with different allocation types. The causal inference model receives historical utilization data, historical CSAT data, and historical cost data and outputs a response curve indicative of the relationship between customer experience and VM utilization/VM allocation type. In embodiments, the causal inference component 316 includes mechanisms for receiving user specified parameters, i.e., current tradeoff preferences, for adjusting the response curve to reflect preferences for customer experience and VM utilization. In embodiments, the response curve is indicative of an optimal number of sessions per VM threshold that correlates to a minimal impact on customer satisfaction levels. The VM threshold corresponds to a predetermined number of VMs which together constitute a single entity for the purposes of utilization determinations.

Figure 4:
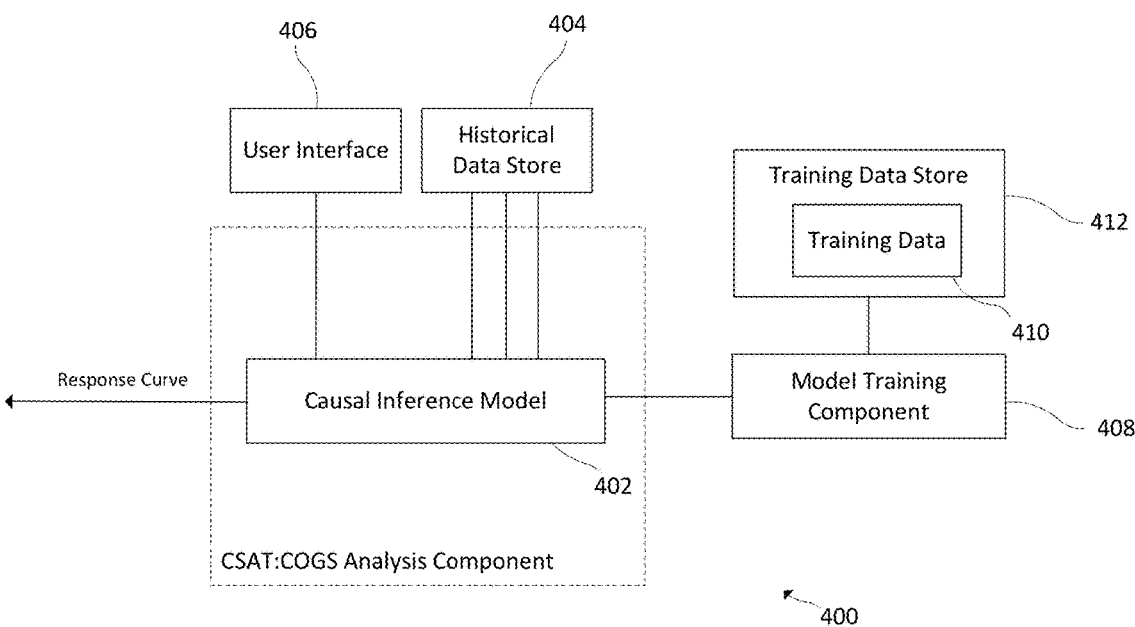
FIG. 4 shows an example implementation of a CSAT: COGS analysis component of the allocation planning system of FIG. 3.

FIG. 4 shows an example implementation of a CSAT: COGS analysis component 400. The CSAT:COGS analysis component 400 includes a causal inference model 402 and a model training component 408 for training the causal inference model 402. The causal inference model 402 is configured to receive historical utilization data, historical CSAT data, and historical cost data from a historical data store 404. The causal inference model is also configured to receive user preference data, such as current tradeoff preferences, from a user interface 406 for the system. A model training component 408 is configured to train the causal inference model 402 using training data 410 stored in a training data store 412 to provide initial and ongoing training for the causal inference model 402. The training data 410 may be based on historical utilization data, historical CSAT data, and historical cost data which have been identified and/or created as examples to indicate causal relationships between customer satisfaction and VM utilization.

The causal inference model 402 may implement any suitable machine learning algorithm (MLA) for correlating historical utilization data and/or historical cost data to historical CSAT data to develop a response curve indicative of the relationship between customer satisfaction and VM utilization, such as decision trees, random decision forests, neural networks, deep learning (for example, convolutional neural networks), support vector machines, regression (for example, support vector regression, Bayesian linear regression, or Gaussian process regression). To the extent that historical data does not include the full spectrum of VM utilization, the relationships are extrapolated to infer the complete response curve.

Returning to FIG. 3, the spot eviction modeling component 306 uses an eviction rate model 318 to process a weighted average of historical eviction rate data to estimate an eviction rate for spot VMs. The eviction rate indicates the probability that a spot VM that is active at that time will be evicted within a time horizon, e.g., up to 7 days. The weighted average is based on predetermined time period of historical eviction rate data. In embodiments, the predetermined time period is three weeks although any suitable time period may be used. The historical eviction rate data may pertain to the region and/or the VM family associated with the VMs being allocated. In embodiments, the eviction rate model 318 is trained to estimate the eviction rate with a predetermined granularity, e.g., hourly. The estimated eviction rate is correlated to utilization levels which enables the peaks of eviction rates to be approximated to utilization peaks.

In embodiments, the spot eviction modeling component 306 generates eviction rate data as an output for the allocation optimizer component 308. The eviction rate data is indicative of the eviction rate estimated based on the weighted average of historical eviction rate data. In embodiments, the eviction rate data comprises an overallocation factor which is indicative of the probability of spot VM eviction. The eviction rate data may be generated according to a predetermined confidence level. The spot eviction modeling component 306 includes mechanisms that enable users to select the confidence level to use for selecting eviction rate data to provide to the allocation optimizer component 308.

Figure 5:
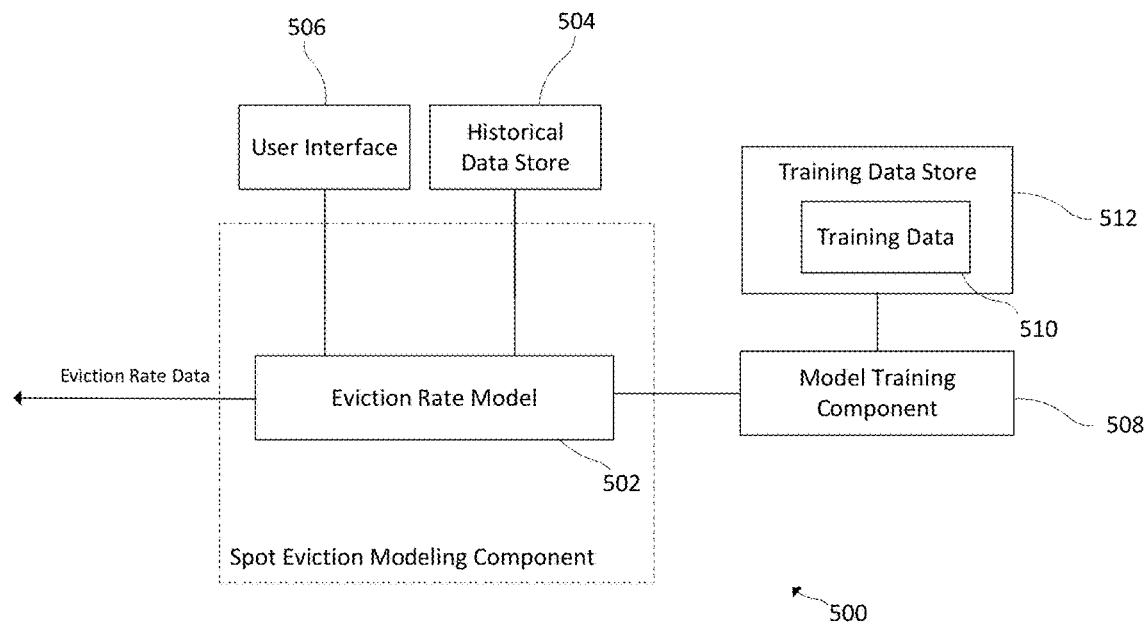
FIG. 5 shows an example implementation of a spot eviction modeling component of the allocation planning system of FIG. 3.

FIG. 5 shows an example implementation of a spot eviction modeling component 500. The spot eviction modeling component 500 includes an eviction rate model 502 and a model training component 508 for training the eviction rate model 502. The eviction rate model 502 is configured to receive historical eviction rate data from a historical data store 504. The eviction rate model 502 is also configured to receive user preference data, such as a confidence parameter, from a user interface 506 for the system. The confidence parameter is used to set the minimum confidence score for the eviction rate data that is selected to output to the allocation optimizer 308. The eviction rate model 502 is trained to generate the weighted average and determine the appropriate weighting scheme to utilize for achieving an accurate estimate of the current eviction rate for the system being analyzed. The model training component 508 is configured to train the eviction rate model 502 using training data 510 stored in a training data store 512 to provide initial and ongoing training for the eviction rate model 502. The training data 510 may be based on historical eviction rate data and/or weighted averages of historical eviction rate data that have been identified and/or created as examples to indicate eviction rate probabilities associated with various allocations of VM resources. The eviction rate model 502 may implement any suitable MLA for estimating eviction rate based on a weighted average of historical eviction rate data, such as decision trees, random decision forests, neural networks, deep learning (for example, convolutional neural networks), support vector machines, regression (for example, support vector regression, Bayesian linear regression, or Gaussian process regression).

Referring again to FIG. 3, the allocation optimizer component 308 includes an allocation optimizer model 320 that receives the demand forecast from the demand forecasting component 302, the response curve data from the CSAT: COGS analysis component 304 indicating optimal sessions per VM threshold, and the eviction rate data from the spot eviction modeling component 306. The allocation optimizer model 320 also receives current allocation data pertaining to the VMs being allocated, such as the current allocation and relative costs of allocations. The allocation optimizer model 320 also receives capacity constraint data, such as a minimum number of active VMs that must be maintained, time period for VM provisioning, a maximum deallocation count (e.g., deallocation counts must be fewer than half of remaining machines), and the like. In embodiments, the allocation optimizer component 308 includes mechanisms for receiving the current allocation data and/or the constraint data as user inputs.

The allocation optimizer model 320 comprises a mixed-integer programming engine for processing the demand forecast, the response curve data, the eviction rate data, current allocation data, and constraint data to produce an optimal allocation plan. The allocation plan specifies the amount of each type of VM that should be online every moment over a predetermined time period, e.g., a week, to meet expected demand in the most cost-efficient manner. Mixed integer programming is a linear programming model that maximizes (or minimizes) a linear objective function subject to one or more constraints with the additional condition that at least one of the decision variables is an integer.

In this case, the objective function is the cost of allocation which is to be minimized. Minimizing the objective function involves determining values for a plurality of decision variables that result in the minimization of the cost of allocation. The decision variables correspond to the numbers of the different VM allocation types to allocate at any given moment within an allocation time period that results in the lowest cost of allocation. The determination of the optimal values of the decision variables is subject to constraints defined by the various inputs to the allocation optimizer 308, such as the demand forecast indicating the number of future sessions that is forecast to be required at any given moment within a future allocation time period, the utilization thresholds which take into consideration customer satisfaction, the spot eviction data which indicates probability of spot VM eviction within the allocation time period, current allocation data indicating current allocation parameters and costs, and any additional capacity constraint data.

Figure 6:
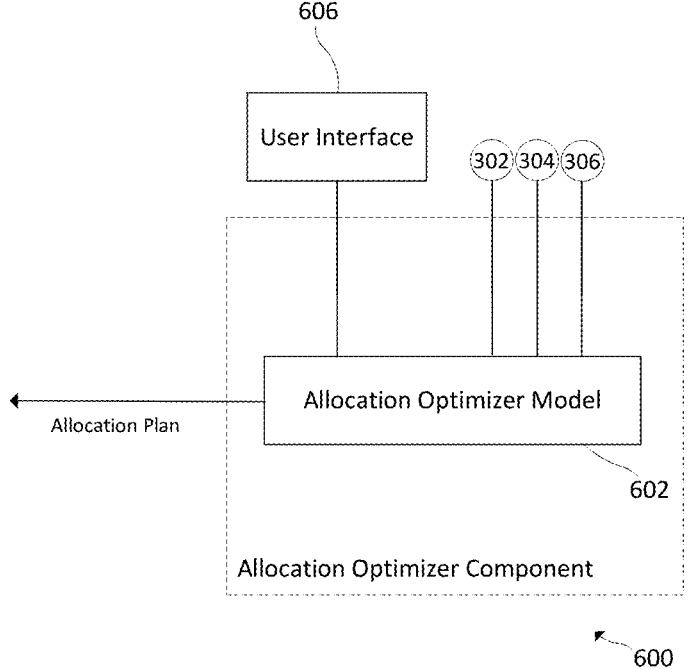
FIG. 6 shows an example implementation of an allocation optimizer component of the allocation planning system of FIG. 3.

FIG. 6 shows an example implementation of an allocation optimizer component 600. The optimizer component 600 includes an allocation optimizer model 602. The allocation optimizer model 602 receives the demand forecasting component 302, the response curve data from the CSAT:COGS analysis component 304 indicating optimal sessions per VM threshold, and the eviction rate data from the spot eviction modeling component 306. The allocation optimizer model 602 also receives current allocation and relative cost data, as well as capacity constraint data. The allocation optimizer model 602 may receive the current allocation data, relative cost data and/or capacity constraint data as user inputs via a user interface 606

The allocation optimizer model 602 may implement any suitable mixed-integer optimization solver to identify the numbers of each VM allocation type that results in the lowest cost of allocation subject to the constraints indicated by the demand forecast, response curve data, eviction rate data, current allocation data and capacity constraint data.

Returning to FIG. 3, the allocation planning system 300 includes the infrastructure components necessary to gather, store and communicate the data received as inputs to the system (i.e., the historical demand data, historical utilization data, historical CSAT data, historical cost data, and historical eviction rate data, current allocation data, capacity constraint data and user preference/selection parameters), as well as intermediate data (i.e., the demand forecast data, utilization threshold data, and spot eviction rate data) and result data (i.e., the optimal allocation plan). In embodiments, historical data may be stored in a historical data store 310 which may be accessed by each component to retrieve the historical data needed by the component.

Figure 7:
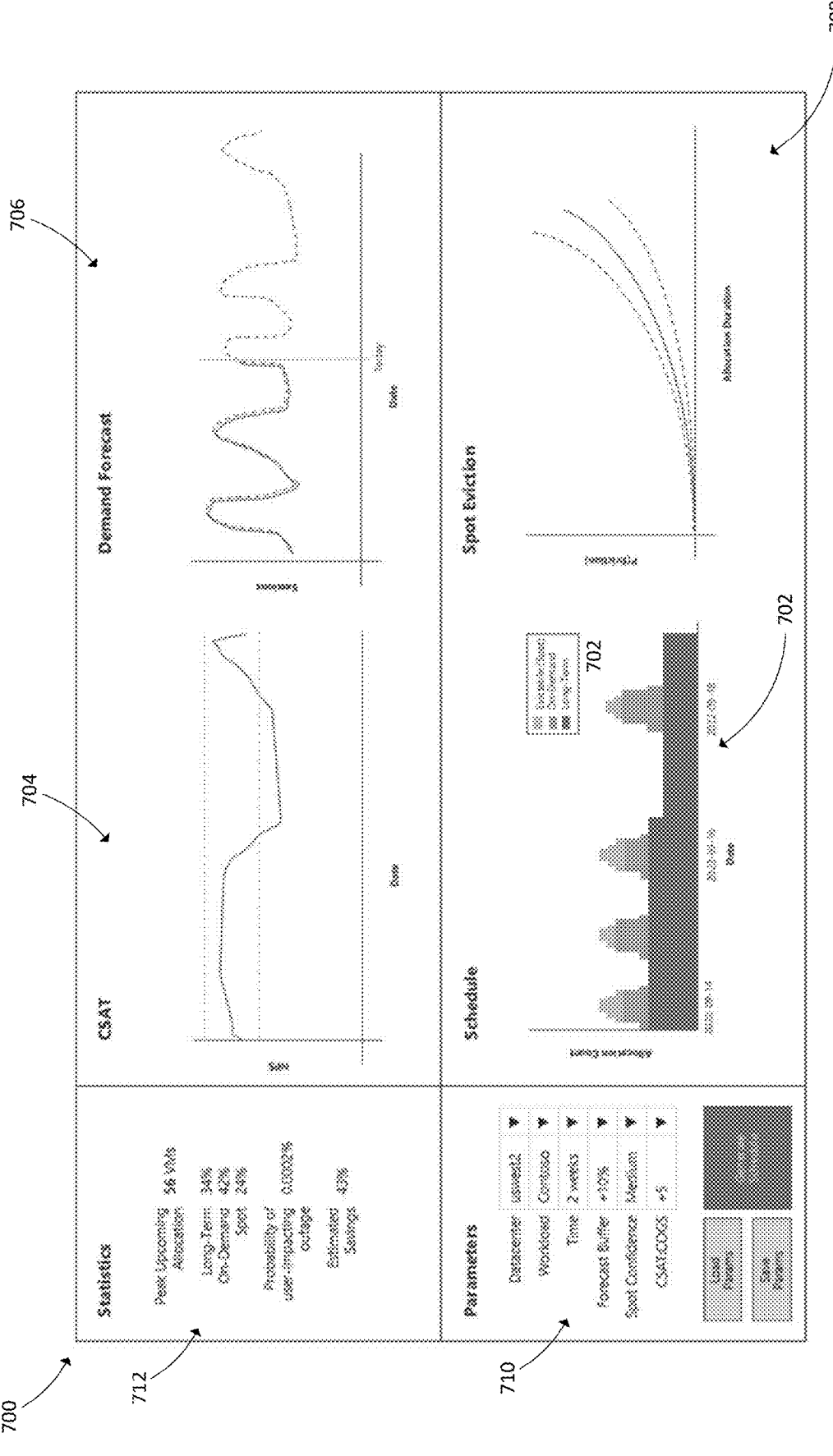
FIG. 7 shows an example user interface for the allocation planning system of FIG. 3.

The allocation planning system 300 also includes a user interface 312 for displaying visual representations of information pertaining to the operation of the components of the system. The user interface 312 also enables users to provided inputs that may be used to specify various user definable parameters for the system. An example implementation of a user interface 700 for an allocation planning system is shown in FIG. 7. The user interface 700 is configured to display a graphical representation 702 of the allocation plan determined by the allocation optimizer component. The user interface may also show graphical representations of data pertaining to the other components of the system. In FIG. 7, the user interface 700 shows customer satisfaction information 704 in the form of a visual representation (e.g., a curve or graph) that shows expected customer satisfaction over the allocation time period. Expected customer satisfaction may be estimated based on the optimal allocation plan generated by the allocation optimizer component and the response curve determined by the CSAT:COGS analysis component. In embodiments, the user interface 700 is configured to display visual representations of one or both of the demand forecast 706 for the allocation time period generated by the demand forecasting component and the eviction rate probability 708 over the allocation time period determined by the spot eviction modeling component.

The user interface 700 may also include user interface controls 710 for receiving as well as displaying the values for the various user selectable parameters, such as the forecast tuning parameters and forecast confidence constraints (for the demand forecasting component), user experience/VM utilization preference parameters (for the CSAT: COGS analysis component), eviction rate confidence constraints (for the spot eviction modeling component), and capacity constraints (for the allocation optimizer component). The user interface 700 may also be configured to display other parameters and/or statistics 712 pertaining to the operation of the system, such as peak upcoming allocation level, current allocation scheme (e.g., percentages of each allocation type), probability of user impacting outage, and estimated cost savings.

An example method 800 for determining an optimal allocation plan for allocating VMs to a service hosted by a cloud service provider is shown in FIG. 8. The method begins with estimating a demand forecast for allocating the VMs to the service hosted based on historical demand data (block 802). A causal inference mode is used to determine a response curve that correlates user experience to VM utilization based on historical utilization data, historical customer satisfaction data, and historical cost data (block 804). An eviction rate indicating a probability of a spot VM being evicted from the service is estimated (block 806). The demand forecast, response curve and eviction rate along with current allocation data and current pricing data for different VM allocation types are then processed together using mixed-integer optimization to determine the optimal allocation plan (block 808).

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
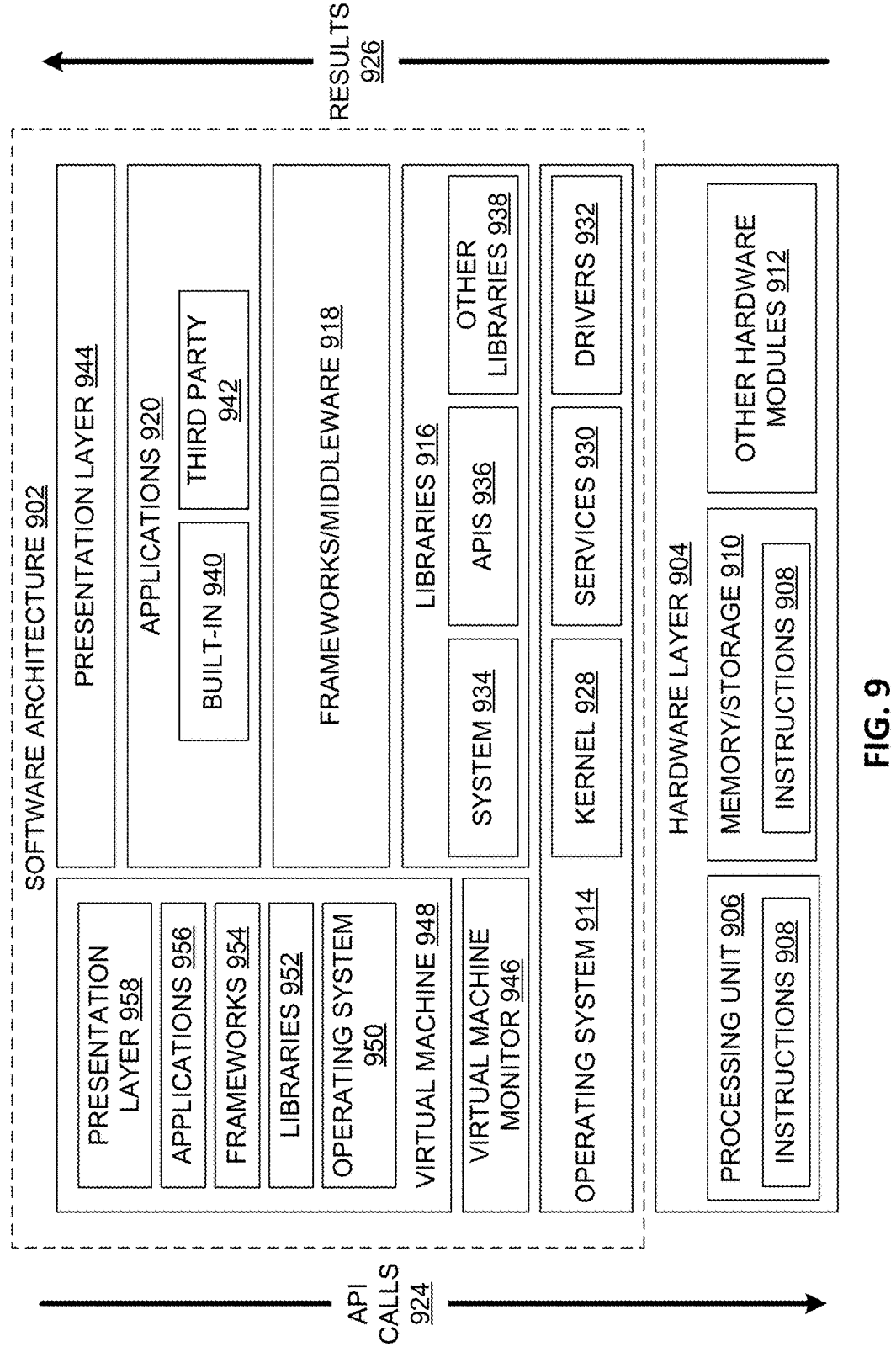
FIG. 9 is a block diagram showing an example software architecture, various portions of which may be used in conjunction with various hardware architectures herein described, which may implement any of the described features.

FIG. 9 is a block diagram 900 illustrating an example software architecture 902, various portions of which may be used in conjunction with various hardware architectures herein described, which may implement any of the above-described features. FIG. 9 is a non-limiting example of a software architecture, and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs 936 for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/ modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
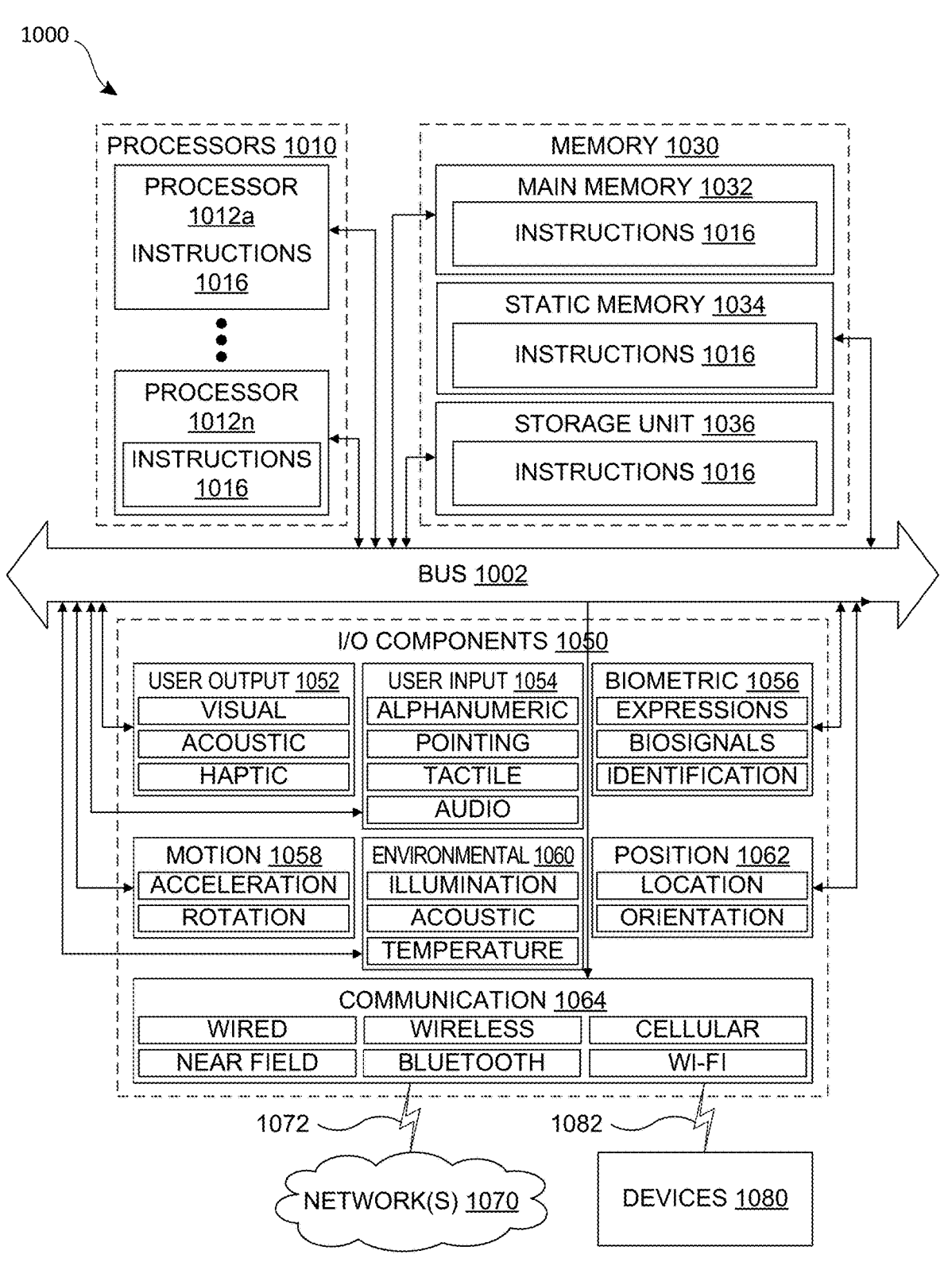
FIG. 10 is a block diagram showing components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:
  a processor; and
  a machine-readable medium storing executable instructions that, when executed, cause the processor to perform operations comprising:
    estimating a demand forecast for allocating virtual machines (VMs) to a service hosted by a cloud service provider over a predetermined allocation time period based on historical demand data;
    using a causal inference model to determine a response curve that correlates user experience to VM utilization, the causal inference model receiving historical utilization data, historical customer satisfaction data, and historical cost data and producing the response curve as an output;
    estimating an eviction rate for spot VMs based on historical eviction data; and
    using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period.

Item 2. The data processing system of item 1, wherein the demand forecast is estimated using one or more forecasting algorithms.

Item 3. The data processing system of any of items 1-2, wherein the response curve indicates an optimal number of sessions per VM threshold that minimizes impact of utilization of VMs on user satisfaction.

Item 4. The data processing system of any of items 1-3, wherein the historical customer satisfaction data is based on a Customer Satisfaction (CSAT) metric based on user input to questions pertaining to use of services provided by the cloud service provider.

Item 5. The data processing system of any of items 1-4, wherein the eviction rate indicates a probability that a spot VM will be evicted within a predetermined time horizon.

Item 6. The data processing system of any of items 1-5, wherein a weighted average of the historical eviction data over a predetermined eviction time period is used to estimate the eviction rate.

Item 7. The data processing system of any of items 1-6, wherein the VM allocation types include a spot VM allocation type, and
  wherein the estimated eviction rate is used to determine how many spot VMs to allocate as part of the allocation plan.

Item 8. The data processing system of any of items 1-7, wherein the VM allocation types include an on-demand type and a reserved type, and
  wherein the allocation plan identifies a number of the on-demand type and a number of the reserved type to allocate as part of the allocation plan.

Item 9. The data processing system of any of items 1-8, wherein the allocation time period is at least a week.

Item 10. The data processing system of any of items 1-9, wherein the mixed-integer optimization involves minimizing a cost of allocation of VMs for the service,
  wherein the numbers of each of the VM allocation types correspond to decision variables for the mixed-integer optimization that are used to minimize the cost of allocation, and
  wherein the demand forecast, the response curve, the eviction rate, the current allocation data, and the current pricing data correspond to constraints for the mixed-integer optimization.

Item 11. The data processing system of any of items 1-11, wherein the operations further comprise:
  displaying a graphical representation of the allocation plan on a user interface; and
  receiving input from a user via the user interface that specifies at least one user selectable parameter, the at least one user selectable parameter being used in determining at least one of the demand forecast, the response curve, the eviction rate, and the allocation plan.

Item 12. A method for determining allocation plan for identifying numbers of VMs of each of a plurality of VM allocation types to allocate to a service hosted by a cloud service provider during an allocation time period, the method comprising:

estimating a demand forecast for allocating virtual machines (VMs) to a service hosted by a cloud service provider over a predetermined allocation time period based on historical demand data;

using a causal inference model to determine a response curve that correlates user experience to VM utilization, the causal inference model receiving historical utilization data, historical customer satisfaction data, and historical cost data and producing the response curve as an output;

estimating an eviction rate for spot VMs based on historical eviction data; and using an allocation optimizer model to process the demand forecast, the response curve, and the eviction rate along with current allocation data and current pricing data corresponding to a plurality of different VM allocation types to determine an allocation plan that identifies numbers of VMs of each of the VM allocation types to allocate during the allocation time period.

Item 13. The method of item 12, wherein the allocation optimizer model processes the demand forecast, the response curve, the eviction rate, the current allocation data, and the current pricing data using mixed-integer integration to determine the allocation plan.

Item 14. The method of any of items 12-13, wherein the mixed-integer optimization involves minimizing a cost of allocation of VMs for the service, wherein the numbers of each of the VM allocation types correspond to decision variables for the mixed-integer optimization that are used to minimize the cost of allocation, and wherein the demand forecast, the response curve, the eviction rate, the current allocation data, and the current pricing data correspond to constraints for the mixed-integer optimization.

Item 15. The method of any of items 12-14, wherein the response curve indicates an optimal number of sessions per VM threshold that minimizes impact of utilization of VMs on user satisfaction.

Item 16. The method of any of items 12-15, wherein the historical customer satisfaction data is based on a Customer Satisfaction (CSAT) metric based on user input to questions pertaining to use of services provided by the cloud service provider.

Item 17. The method of any of items 12-16, wherein a weighted average of the historical eviction data over a predetermined eviction time period is used to estimate the eviction rate.

Item 18. The method of any of items 12-17, wherein the VM allocation types include a spot VM allocation type, and wherein the estimated eviction rate is used to determine how many spot VMs to allocate as part of the allocation plan.

Item 19. The method of any of items 12-18, wherein the VM allocation types include an on-demand type and a reserved type, and wherein the allocation plan identifies a number of the on-demand type and a number of the reserved type to allocate as part of the allocation plan.

Item 20. A non-transitory computer readable medium on which are stored instructions that, when executed by a processor, cause a programmable device to perform functions of:

estimating a demand forecast for allocating virtual machines (VMs) to a service hosted by a cloud service provider over a predetermined allocation time period based on historical demand data;

using a causal inference model to determine a response curve that correlates user experience to VM utilization, the causal inference model receiving historical utilization data, historical customer satisfaction data, and historical cost data and producing the response curve as an output;

estimating an eviction rate for spot VMs based on historical eviction data; and using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
estimating a demand forecast for allocating virtual machines (VMs) to a service hosted by a cloud service provider over a predetermined allocation time period based on historical demand data;
using a causal inference model to determine a response curve that correlates user experience to VM utilization, the causal inference model receiving historical utilization data, historical customer satisfaction data, and historical cost data and producing the response curve as an output;
estimating an eviction rate for spot VMs based on historical eviction data; and
using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period; and
performing a resource allocation for the service based on the determined allocation plan during the allocation time period.

2. The data processing system of claim 1, wherein the demand forecast is estimated using one or more forecasting algorithms.

3. The data processing system of claim 1, wherein the response curve indicates an optimal number of sessions per VM threshold that minimizes impact of utilization of VMs on user satisfaction.

4. The data processing system of claim 3, wherein the historical customer satisfaction data is based on a Customer Satisfaction (CSAT) metric based on user input to questions pertaining to use of services provided by the cloud service provider.

5. The data processing system of claim 1, wherein the eviction rate indicates a probability that a spot VM will be evicted within a predetermined time horizon.

6. The data processing system of claim 1, wherein a weighted average of the historical eviction data over a predetermined eviction time period is used to estimate the eviction rate.

7. The data processing system of claim 1, wherein the VM allocation types include a spot VM allocation type, and
wherein the estimated eviction rate is used to determine how many spot VMs to allocate as part of the allocation plan.

8. The data processing system of claim 7, wherein the VM allocation types include an on-demand type and a reserved type, and
wherein the allocation plan identifies a number of the on-demand type and a number of the reserved type to allocate as part of the allocation plan.

9. The data processing system of claim 1, wherein the allocation time period is at least a week.

10. The data processing system of claim 1, wherein the mixed-integer optimization involves minimizing a cost of allocation of VMs for the service,
wherein the numbers of each of the VM allocation types correspond to decision variables for the mixed-integer optimization that are used to minimize the cost of allocation, and
wherein the demand forecast, the response curve, the eviction rate, the current allocation data, and the current pricing data correspond to constraints for the mixed-integer optimization.

11. The data processing system of claim 1, wherein the operations further comprise:
displaying a graphical representation of the allocation plan on a user interface; and
receiving input from a user via the user interface that specifies at least one user selectable parameter, the at least one user selectable parameter being used in determining at least one of the demand forecast, the response curve, the eviction rate, and the allocation plan.

12. A method for determining allocation plan for identifying numbers of VMs of each of a plurality of VM allocation types to allocate to a service hosted by a cloud service provider during an allocation time period, the method comprising:
estimating a demand forecast for allocating virtual machines (VMs) to a service hosted by a cloud service provider over a predetermined allocation time period based on historical demand data;

using a causal inference model to determine a response curve that correlates user experience to VM utilization, the causal inference model receiving historical utilization data, historical customer satisfaction data, and historical cost data and producing the response curve as an output;

estimating an eviction rate for spot VMs based on historical eviction data; and using an allocation optimizer model to process the demand forecast, the response curve, and the eviction rate along with current allocation data and current pricing data corresponding to a plurality of different VM allocation types to determine an allocation plan that identifies numbers of VMs of each of the VM allocation types to allocate during the allocation time period; and performing a resource allocation for the service based on the determined allocation plan during the allocation time period.

13. The method of claim 12, wherein the allocation optimizer model processes the demand forecast, the response curve, the eviction rate, the current allocation data, and the current pricing data using mixed-integer optimization to determine the allocation plan.

14. The method of claim 13, wherein the mixed-integer optimization involves minimizing a cost of allocation of VMs for the service, wherein the numbers of each of the VM allocation types correspond to decision variables for the mixed-integer optimization that are used to minimize the cost of allocation, and wherein the demand forecast, the response curve, the eviction rate, the current allocation data, and the current pricing data correspond to constraints for the mixed-integer optimization.

15. The method of claim 12, wherein the response curve indicates an optimal number of sessions per VM threshold that minimizes impact of utilization of VMs on user satisfaction.

16. The method of claim 15, wherein the historical customer satisfaction data is based on a Customer Satisfaction (CSAT) metric based on user input to questions pertaining to use of services provided by the cloud service provider.

17. The method of claim 12, wherein a weighted average of the historical eviction data over a predetermined eviction time period is used to estimate the eviction rate.

18. The method of claim 12, wherein the VM allocation types include a spot VM allocation type, and wherein the estimated eviction rate is used to determine how many spot VMs to allocate as part of the allocation plan.

19. The method of claim 18, wherein the VM allocation types include an on-demand type and a reserved type, and wherein the allocation plan identifies a number of the on-demand type and a number of the reserved type to allocate as part of the allocation plan.

20. A non-transitory computer readable medium on which are stored instructions that, when executed by a processor, cause a programmable device to perform functions of:

estimating a demand forecast for allocating virtual machines (VMs) to a service hosted by a cloud service provider over a predetermined allocation time period based on historical demand data;

using a causal inference model to determine a response curve that correlates user experience to VM utilization, the causal inference model receiving historical utilization data, historical customer satisfaction data, and historical cost data and producing the response curve as an output;

estimating an eviction rate for spot VMs based on historical eviction data; and using an allocation optimizer model to process the demand forecast, the response curve, and the eviction rate along with current allocation data and current pricing data corresponding to a plurality of different VM allocation types using mixed-integer optimization to determine an allocation plan that identifies numbers of VMs of each of the VM allocation types to allocate during the allocation time period; and performing a resource allocation for the service based on the determined allocation plan during the allocation time period.

* * * * *